US010459250B2

(12) United States Patent
Pugh et al.

(10) Patent No.: US 10,459,250 B2
(45) Date of Patent: *Oct. 29, 2019

(54) METHODS AND APPARATUS TO ENHANCE OXYGEN CONCENTRATIONS FOR ADVANCED OPHTHALMIC DEVICES

(71) Applicant: Johnson & Johnson Vision Care, Inc., Jacksonville, FL (US)

(72) Inventors: Randall B. Pugh, St. Johns, FL (US); Adam Toner, Jacksonville, FL (US); Frederick A. Flitsch, New Windsor, NY (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/920,733

(22) Filed: Mar. 14, 2018

(65) Prior Publication Data

US 2018/0203256 A1 Jul. 19, 2018

Related U.S. Application Data

(62) Division of application No. 15/098,781, filed on Apr. 14, 2016, now Pat. No. 9,964,780.

(51) Int. Cl.
*G02C 7/04* (2006.01)
*G02C 11/00* (2006.01)
*G02C 7/08* (2006.01)

(52) U.S. Cl.
CPC ............. *G02C 7/049* (2013.01); *G02C 7/047* (2013.01); *G02C 11/10* (2013.01); *G02C 7/081* (2013.01); *G02C 2202/06* (2013.01)

(58) Field of Classification Search
CPC ........ G02C 7/049; G02C 7/047; G02C 11/10; G02C 7/081; G02C 2202/06
USPC ..................................................... 359/159.04
See application file for complete search history.

(56) References Cited

U.S. PATENT DOCUMENTS

| 4,268,132 A * | 5/1981 | Neefe .............. B29D 11/00076 |
| | | 351/159.33 |
| 5,104,213 A | 4/1992 | Wolfson |
| 2010/0036488 A1 * | 2/2010 | de Juan, Jr. ............... A61F 2/14 |
| | | 623/5.16 |

(Continued)

FOREIGN PATENT DOCUMENTS

| WO | WO1990008339 A1 | 7/1990 |
| WO | WO2002010841 A1 | 2/2002 |

(Continued)

OTHER PUBLICATIONS

European Search Report for corresponding EPA No. 17166610.0 dated Jul. 12, 2017.

(Continued)

*Primary Examiner* — George G King

(57) ABSTRACT

Methods and apparatus to enhance levels of oxygen in tear fluid under a worn advanced contact lens are described. The advanced contact lens may include an insert which is impermeable to fluid flow across its body. The method of enhancement may include creating pores through the insert, creating channels in portions of the contact lens body, including layers of absorptive material, including devices to generate or release oxygen or means of moving tear fluid under the contact lens.

2 Claims, 11 Drawing Sheets

(56) References Cited

U.S. PATENT DOCUMENTS

| | | |
|---|---|---|
| 2010/0076553 A1 | 3/2010 | Pugh |
| 2014/0268027 A1 | 9/2014 | Pugh |
| 2014/0343387 A1 | 11/2014 | Pugh |
| 2014/0354946 A1 | 12/2014 | Pugh |
| 2015/0077662 A1* | 3/2015 | Pugh ............ G02C 7/04 349/13 |
| 2015/0138500 A1 | 5/2015 | de Juan, Jr. et al. |
| 2015/0146160 A1 | 5/2015 | Jubin et al. |
| 2015/0286072 A1* | 10/2015 | Clarke ............ B29D 11/00807 351/159.03 |
| 2017/0123235 A1* | 5/2017 | Chien ............ B29C 41/46 |
| 2017/0146694 A1* | 5/2017 | Chien ............ G02B 1/043 |

FOREIGN PATENT DOCUMENTS

| | | |
|---|---|---|
| WO | WO2008106449 A1 | 9/2008 |
| WO | WO2012149056 A1 | 11/2012 |
| WO | WO2015073718 A1 | 5/2015 |
| WO | WO2017/151364 A1 | 9/2017 |

OTHER PUBLICATIONS

Singapore Written Opinion for Application No. 10201702679X Date of Written Opinion dated Aug. 30, 2018.

\* cited by examiner

FIG. 1A
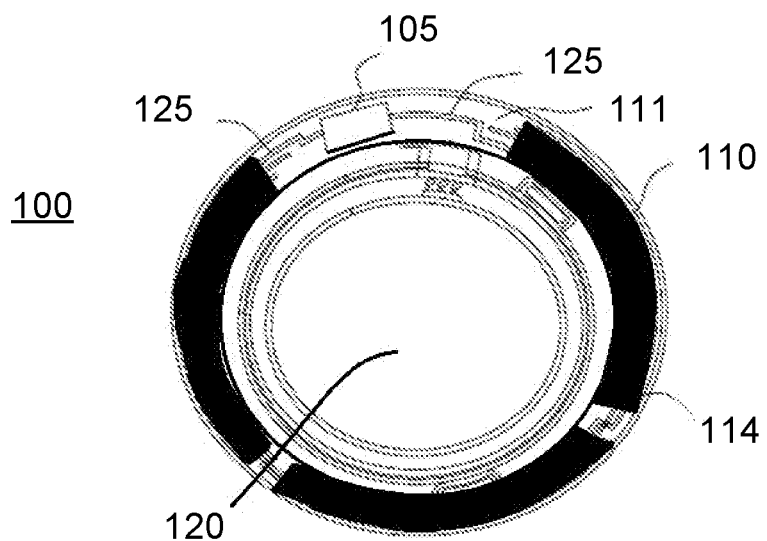
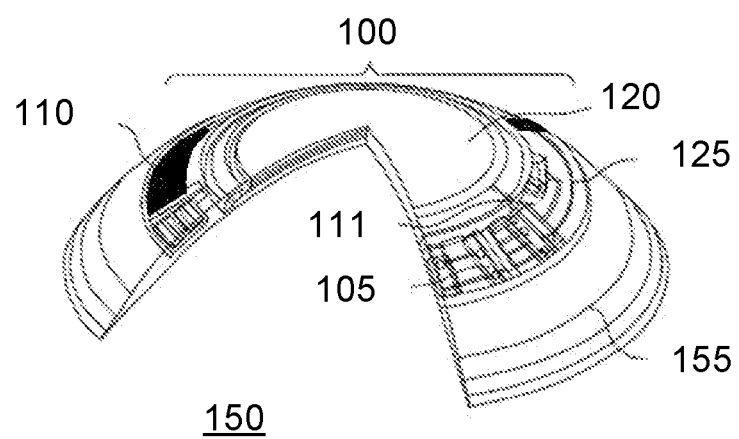
FIG. 1B

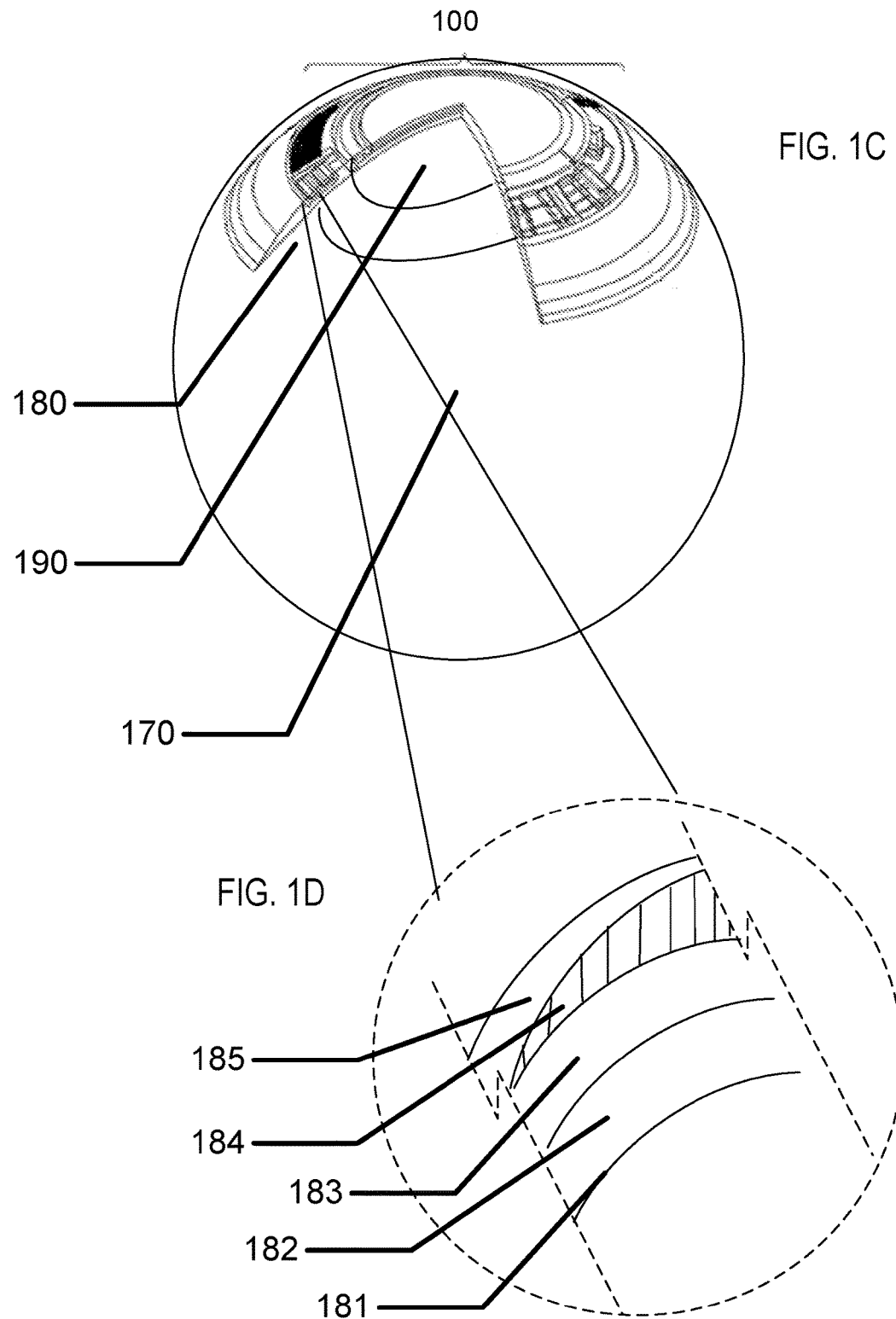

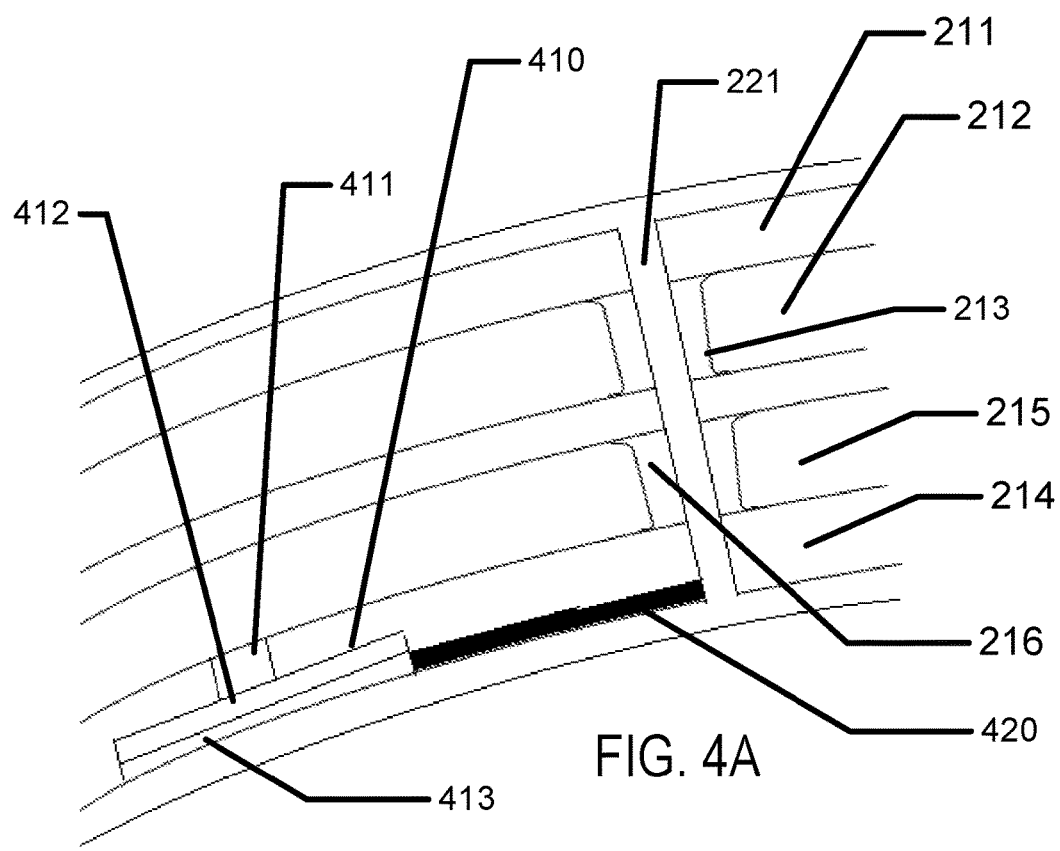
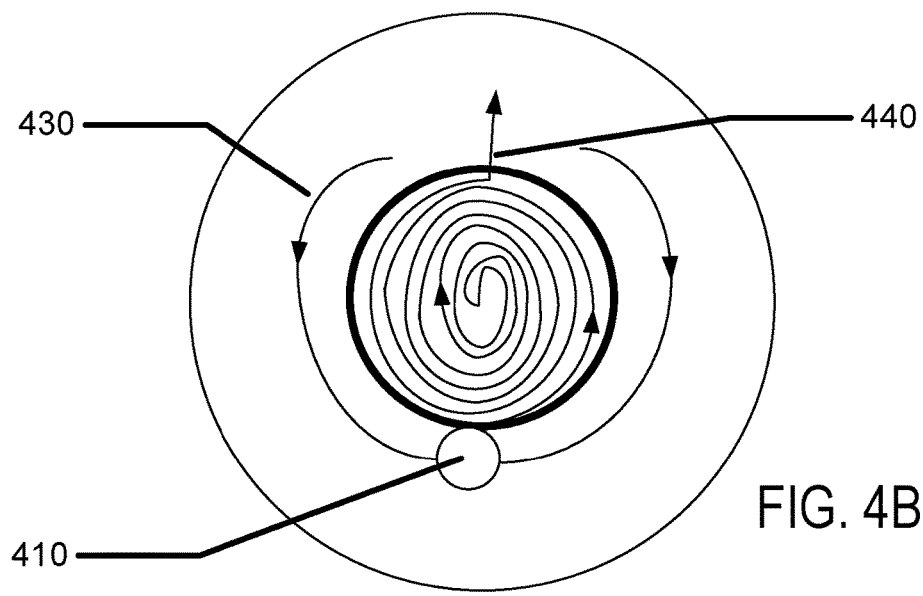

METHODS AND APPARATUS TO ENHANCE OXYGEN CONCENTRATIONS FOR ADVANCED OPHTHALMIC DEVICES

CROSS REFERENCE TO RELATED APPLICATION

The present application is a divisional application of U.S. patent application Ser. No. 15/098,781 filed on Apr. 14, 2016.

BACKGROUND OF THE INVENTION

1. Field of the Invention

Methods and apparatus to enhance the concentration of oxygen at the interface of an advanced ophthalmic device with the user's eyes are described. In some embodiments, the methods and apparatus to enhance oxygen concentration involve forming pores which are non-perturbative to imagining through the ophthalmic device. In some embodiments, storage of oxygen is involved. In some embodiments, movement of fluids which contain oxygen provides a solution. In some embodiments, a field of use for the methods and apparatus may include any ophthalmic device or product utilizing an embedded insert device.

2. Discussion of the Related Art

Recently, the number of medical devices and their functionality has begun to rapidly develop. A significant advance has been made in the field of ophthalmics, where electroactive functions are being incorporated into ophthalmic lenses. Some embodiments of these devices may include components such as semiconductor devices that perform a variety of functions. However, such semiconductor components require energy and, thus, energization elements may typically also be included in such biocompatible devices. The shape and relatively small size of the biocompatible devices creates novel and challenging environments for the definition of various functionalities. In many embodiments, it may be important to provide safe, reliable, compact and cost effective means comprising an insert device to contain the electroactive components and energization elements within the biocompatible devices. These insert devices may need to prevent diffusion of various materials into their body. The net effect may be to decrease an inherent ability of oxygen to be located on the eye surface under the ophthalmic device. Therefore, a need exists for novel embodiments of advanced ophthalmic devices to enhance transport of oxygen into the region proximate to the eye surface

SUMMARY OF THE INVENTION

Accordingly, methods and apparatus to enhance levels of oxygen (which may also be called oxygen gas or oxygen molecules) present in the region between a back surface of a worn ophthalmic device and the user's eye are disclosed.

The cornea receives oxygen from the air and the aqueous humor. Aqueous humor is blood filtrate which is essentially blood minus the red blood cells. It is transparent and provides nutrients to both the cornea and the crystalline lens. The ciliary body provides the aqueous humor through the ciliary process. The pre-corneal tear film comprises three layers. The outermost layer is the superficial oily layer, the inner most layer is the mucoid layer and the middle layer which is ninety-eight percent of the tear film is the tear fluid or aqueous layer. The middle layer is responsible for oxygen uptake to maintain corneal metabolism. Essentially oxygen from the air diffuses into the tears and is transferred to the cornea via osmosis.

A healthy cornea requires both oxygen and nutrients from the mechanisms described above. Today's silicone hydrogel contact lenses provide for sufficient oxygen transmission from the air to the teats to the cornea. However, advanced contact lenses such as electronic lenses comprise sealed inserts which may potentially limit oxygen transport. Accordingly, the present invention is directed to various means for ensuring sufficient oxygen transmission to the cornea. In one embodiment, diffusion pores within the body of the encapsulated insert allow for oxygen diffusion through the insert body. In another embodiment, the lens may be designed to store an increased level of oxygen in the body of the lens using various materials or through storage or containment vessels. In yet still another embodiment, passive and active pumping mechanisms may be utilized to move oxygen rich fluids around different regions of the eye.

In some examples a contact lens is provided comprising a hydrogel skirt molded into the shape of a contact lens with an arcuate back surface placed proximate to a user's cornea during a use of the contact lens. The contact lens also includes an insert, wherein the insert is gas impermeable and impermeable to fluid flow through its body. The insert is encapsulated within the hydrogel skirt. And, the insert comprises one or more components mounted thereupon. The contact lens has a first region of the hydrogel skirt, wherein the first region of the hydrogel skirt is that portion of the hydrogel skirt that is between a surface of the insert and a cornea of a user during the use of the contact lens. The exemplary contact lens also includes a means within the contact lens of enhancing oxygen levels within a fluid in contact with the first region.

In some examples, the means within the contact lens of enhancing oxygen levels within the fluid in contact with the first region comprises at least a first pore in the insert, wherein the pore traverses the body of the insert. In some examples, the pore traverses a body of a spacer located within a chamber within the insert. In some examples, the pore is back-filled with a silicone containing material. In some examples, the first pore is one of a plurality of pores, wherein the plurality of pores traverse the body of the insert. In some examples, the plurality of pores are back-filled with the silicone containing material.

In some examples, the means within the contact lens of enhancing oxygen levels within the fluid in contact with the first region comprises a layer of absorptive material, wherein the absorptive material absorbs oxygen gas. In some examples, the absorptive material comprises hemoglobin. In some examples, the absorptive material comprises hemocyanin. In some examples, the absorptive material comprises a porphyrin based material. In some examples, the absorptive material comprises a metal organic framework molecular species.

In some examples, the means within the contact lens of enhancing oxygen levels within the fluid in contact with the first region comprises an embedded electroactive releasing structure, wherein oxygen stored in a vessel is released upon an electrical signal. In some examples, the electrical signal causes an electrical current to melt a cover of a metallic foil.

In some examples, the means within the contact lens of enhancing oxygen levels within the fluid in contact with the first region comprises an electroactive oxygen generator. In some examples, the electrical signal causes the electroactive oxygen generator to release a fluid comprising an oxygen containing chemical to interact with a catalytic surface to evolve oxygen gas. In some examples, the electroactive oxygen generator comprises hydrogen peroxide. In some example, the electrical signal causes an electrical current to melt a metallic foil layer.

In some examples, the means within the contact lens of enhancing oxygen levels within the fluid in contact with the first region comprises a pump, wherein the pump causes a movement of tear fluid proximate to the first region of the hydrogel skirt. In some examples, the tear fluid moves in channels formed within the hydrogel skirt. In some examples, the channels are shaped to favor a first direction of flow through the channels. The pump may comprise an electroactive element which in some examples may be one or more of a piezoelectric based transducer or an electroactive polymer based transducer. In some examples, the pump may comprise a raised portion of hydrogel skirt material that interacts with a user's eyelid for engagement of a pumping action.

One general aspect includes methods which enhance oxygen levels at a user's cornea when the user wears a contact lens. The methods may include forming a pore through a contact lens insert. Next the method may include backfilling the pore with a silicone containing polymer; and providing the contact lens comprising the contact lens insert, wherein during the use of the contact lens, oxygen diffuses through the pore with the silicone containing polymer to a region of tear fluid underneath the contact lens.

Another general aspect includes methods which enhance oxygen levels at a user's cornea when the user wears a contact lens. The method includes forming a layer of oxygen absorptive material within a body of the contact lens. The method also includes placing the contact lens in an ambient with high partial pressure of oxygen. Next the method continues by providing the contact lens, wherein during a use of the contact lens, oxygen diffuses from the absorptive material to a region of tear fluid underneath the contact lens.

Another general aspect includes methods which enhance oxygen levels at a user's cornea when the user wears a contact lens. The method including forming a plurality of electroactive oxygen containing structures within a body of the contact lens; and providing the contact lens, wherein during the use of the contact lens a programming of electrical signals provides electrical signals to a first electroactive oxygen containing structure, wherein the electrical signal to the first electroactive oxygen containing structures causes oxygen to diffuse from the electroactive oxygen containing structure to a region of tear fluid underneath the contact lens.

Another general aspect includes methods which enhance oxygen levels at a user's cornea when the user wears a contact lens. The method includes forming a plurality of channels in an arcuate back curved region of a hydrogel skirt of the contact lens. The method also includes forming a raised region of hydrogel skirt above a first enlarged channel in the arcuate back curved region of the hydrogel skirt of the contact lens; and providing the contact lens, wherein during the use of the contact lens an eyelid of the user forces the raised region of hydrogel skirt to compress the first enlarged channel in the arcuate back curved region of the hydrogel skirt, wherein the compression causes tear fluid to move underneath the contact lens, wherein the contact lens comprises an insert comprising one or more components mounted within the insert.

Another general aspect includes methods which enhance oxygen levels at a user's cornea when the user wears a contact lens. The method includes forming an electroactive pump comprising a layer of piezoceramic material fixedly attached to a lens insert of the contact lens. The method also includes forming a plurality of channels in an arcuate back curved region of a hydrogel skirt of the contact lens. The method further includes forming a first enlarged channel in the arcuate back curved region of the hydrogel skirt of the contact lens, wherein the enlarged channel lies proximate to the electroactive pump; and providing the contact lens, wherein during the use of the contact lens a programming of electrical signals provides electrical signals to the electroactive pump, wherein the electrical signal to electroactive pump forces the electroactive pump to compress the first enlarged channel in the arcuate back curved region of the hydrogel skirt, wherein the compression causes tear fluid to move underneath the contact lens.

BRIEF DESCRIPTION OF THE DRAWINGS

The foregoing and other features and advantages of the invention will be apparent from the following, more particular description of preferred embodiments of the invention, as illustrated in the accompanying drawings.

FIGS. 1A-1B illustrate exemplary aspects of contact lenses with inserts, electroactive components and energization elements.

FIGS. 1C-1D illustrate exemplary aspects of a contact lens upon a user's eye with cross sectional focus on the region under the insert above the user's eye.

FIG. 4A illustrates a cross section of an exemplary electroactive pumping mechanism within the body of an exemplary advanced contact lens.

FIG. 4B illustrates an exemplary top down view of an electroactive pumping mechanism within the body of an exemplary advanced contact lens.

DETAILED DESCRIPTION OF THE INVENTION

Figure 2A:
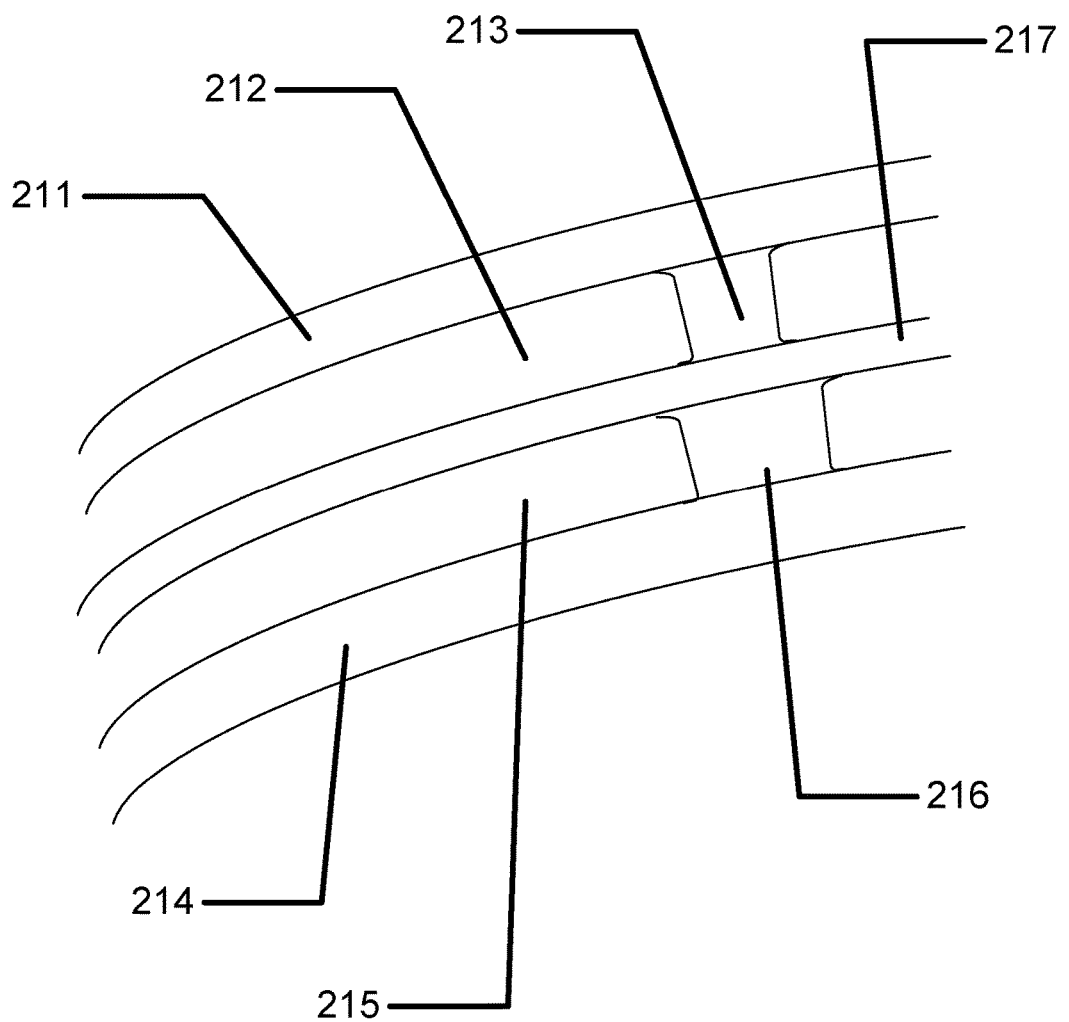
FIG. 2A illustrates a cross section of exemplary aspects of a two chamber electroactive optic system within an insert and a hydrogel skirt.

Methods and apparatus to increase oxygen levels present in the region between an ophthalmic contact lens and a user's eye surface are disclosed in this application. In some examples, the hydrogel skirt used to surround an electroactive insert and provide various functions relating to an electroactive contact lens may itself be a good medium to foster the transport of oxygen around the region that intersects with a contact lens. Therefore, in regions of a contact lens with an imbedded insert that are on the peripheries of the insert body, there may be very good transport of oxygen from the air or ambient environment to the user's eye surface. In some examples, the nature of the formulation, thickness and design of the hydrogel skirt may be aid in realizing a contact lens where sufficient levels of oxygen are present across the user's eye surface. In other examples, other features of the contact lens may be important to realize good oxygen levels in the region between the back surface of the contact lens and the top surface of the user's eye, where the intervening region may also include tear fluid from the user.

Glossary

In the description and claims below, various terms may be used for which the following definitions will apply:

"Biocompatible" as used herein refers to a material or device that performs with an appropriate host response in a specific application. For example, a biocompatible device does not have toxic or injurious effects on biological systems.

"Coating" as used herein refers to a deposit of material in thin forms. In some uses, the term will refer to a thin deposit that substantially covers the surface of a substrate it is formed upon. In other more specialized uses, the term may be used to describe small thin deposits in smaller regions of the surface.

"Energized" as used herein refers to the state of being able to supply electrical current or to have electrical energy stored within.

"Energy" as used herein refers to the capacity of a physical system to do work. Many uses of the energization elements may relate to the capacity of being able to perform electrical actions.

"Energy Source" or "Energization Element" or "Energization Device" as used herein refers to any device or layer which is capable of supplying energy or placing a logical or electrical device in an energized state. The energization elements may include battery cells. The batteries can be formed from alkaline type cell chemistry and may be solid-state batteries or wet cell batteries.

"Film" as used herein refers to a thin layer of a material that may act as a covering or a coating; in laminate structures the film typically approximates a planar layer with a top surface and a bottom surface and a body; wherein the body is typically much thinner than the extent of the layer.

"Mold" as used herein refers to a rigid or semi-rigid object that may be used to form three-dimensional objects from uncured formulations. Some preferred molds include two mold parts that, when opposed to one another, define the structure of a three-dimensional object.

Exemplary Biomedical Device Construction with Encapsulated Inserts

An example of a biomedical device that may incorporate an insert containing energization elements and electroactive elements may be an electroactive focal-adjusting contact lens. Referring to FIG. 1A, an example of such a contact lens insert may be depicted as contact lens insert 100. In the contact lens insert 100, there may be an electroactive element 120 that may accommodate focal characteristic changes in response to controlling voltages. A circuit 105 to provide those controlling voltage signals as well as to provide other function such as controlling sensing of the environment for external control signals may be powered by an energization element such as a biocompatible battery element 110. As depicted in FIG. 1A, the energization element may be found as multiple major pieces, in this case three pieces, and may comprise various configurations of elements. The energization elements may have various interconnect features to join together pieces as may be depicted underlying the region of interconnect 114. The energization elements may be connected to a circuit element that may have its substrate 111 upon which interconnect features 125 may be located. The circuit 105, which may be in the form of an integrated circuit, may be electrically and physically connected to the substrate 111 and its interconnect features 125.

Referring to FIG. 1B, a cross sectional relief of a contact lens 150 may contain contact lens insert 100 and its discussed constituents. The contact lens insert 100 may be encapsulated into a skirt of contact lens hydrogel 155 which may encapsulate the insert and provide a comfortable interface of the contact lens 150 to a user's eye.

Referring to FIG. 1C, the cross sectional relief of FIG. 1B is illustrated superimposed upon a user's eye 170. There may be regions on the surface of the user's eye that may lie under a region of the lens that contains an insert such as region 190. And, there may be regions on the surface of the user's eye that may lie under only the hydrogel skirt such as region 180. In some examples the level of oxygenation in a region of tear fluid and surface tissue may be less in region 190 than in region 180 due to the inhibition of oxygen diffusion from an ambient gas which may be located exterior to the contact lens to the surface of the user's eye. In these examples, other design aspects of the contact lens with encapsulated insert may be warranted.

Referring to FIG. 1D, a cross sectional blow up of a portion of the region 180 under an insert is illustrated. A surface of the user's eye 181, or cornea is illustrated. Above the surface of the user's eye 181 may naturally occur a thin layer of tear fluid 182 that the lens is supported upon. On the other side of the thin layer of tear fluid 182 may be a portion of the hydrogel skirt 183. The shape of the hydrogel skirt which is proximate to a user's cornea or eye may be called an arcuate surface, and this surface may also be called the back surface or back curve surface therefore it may be an arcuate back surface or an arcuate back curved surface. The cross section of FIG. 1D is illustrated at the edge of the lens insert 184. Therefore, a variable thickness layer of the lens skirt 185 above the lens insert 184 is illustrated. The region of the hydrogel skirt under the insert and the associated portion of the layer of tear fluid under the insert may be a region of decreased oxygen levels due to the fact that the lens insert 184 prevents diffusion through its body and the user's eye 181 is consuming oxygen. The tear fluid 182 may also have decreased oxygen level.

Diffusion "Pores" within the Body of an Encapsulated Insert.

Referring to FIG. 2A a cross section of an encapsulated insert is illustrated. In the example, a dual chamber insert may be found. An outer layer may form a top surface 211 of the insert. And, another outer layer may form the bottom surface 214 of the insert. In some examples, these insert surfaces may have shapes and forms to relate to desired optical effects of the insert structure such as being shaped to add power to the lens effect of the insert. In examples with multiple chambers, such as illustrated in FIG. 2A, an intermediate piece 217 may also be formed. In a likewise fashion to the outer layers, the intermediate piece 217 may be shaped to related to optical effects of the lens structure. In some examples, the chambers may have internal structures which may define the structural height of a chamber in a region. These structures may be called spacer's. The first chamber 212 may have a first chamber spacer 213 and the second chamber 215 may have a second chamber spacer 216. In some examples, the location of the spacers may be unrelated to each other, in the example illustrated they may align which may allow for a pore to be formed in the center of them which penetrates through the entire body and out of each insert surface. The spacers may be located in the chambers in regions that are located in the optic zone of the ophthalmic lens, where the optic zone is the portion of the lens where light passes through from an object on its way to the user's retina. If the spacer is located in the optic zone, it may interact with the light rays passing through forming an image. Therefore, it may be important that the spacer is kept to a minimal size. In some examples, the size may be less than 100 microns. In further examples, the size may be less than 50 microns. In still further examples the size may be less than 20 microns.

Figure 2B:
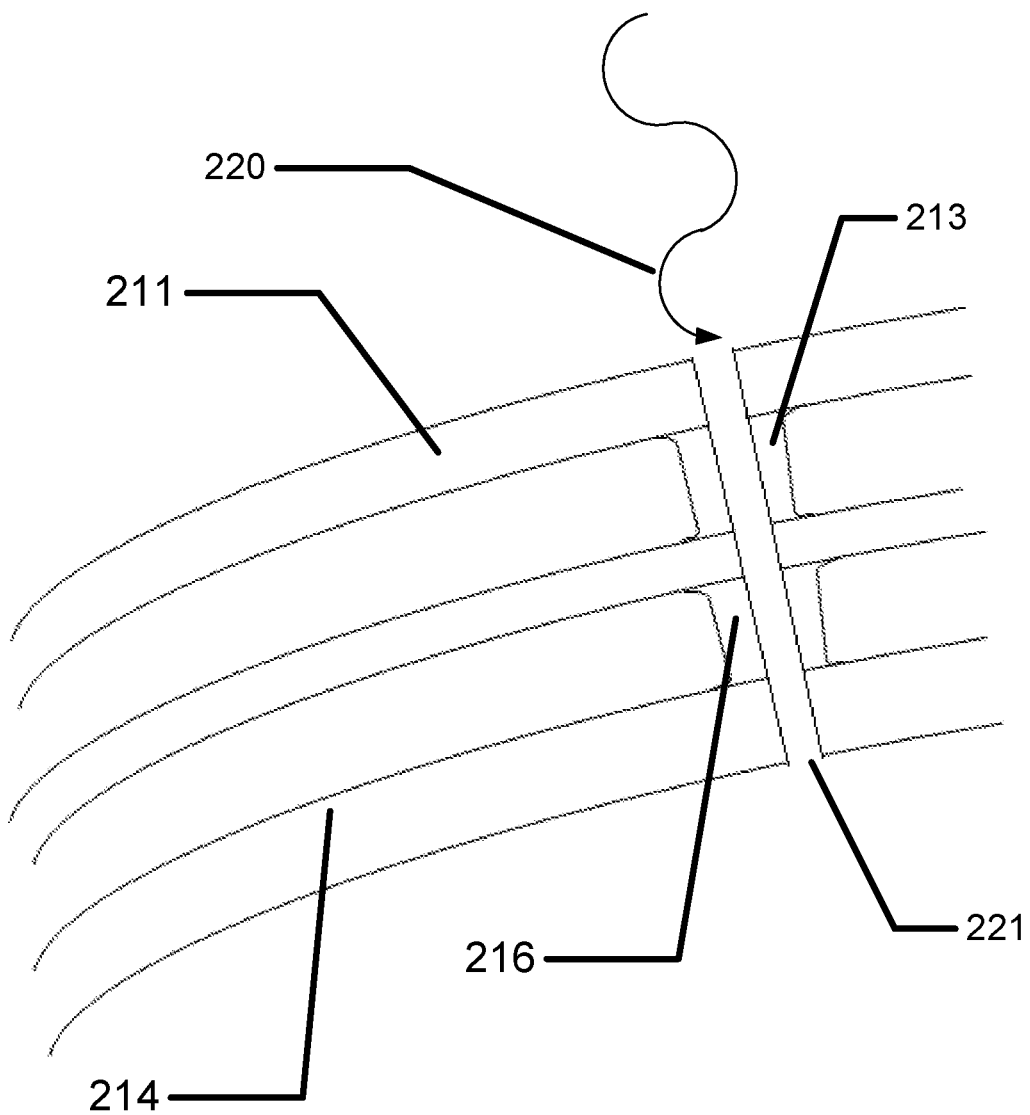
FIG. 2B illustrates a cross section illustrating the cutting of an exemplary through via in an exemplary insert device.

A spacer column may be formed by the overlay of the first chamber spacer 213 and the second chamber spacer 216. Referring to FIG. 2B, the cutting of a pore 221 is illustrated. In some examples, the pore may be cut by a laser light source 220. As an example, a Ytterbium fiber based laser may be focused to drill holes in materials such as plastics with dimensions as small as 10-20 microns in size. Any laser drilling type equipment may be used to create the pore through the top surface 211, the first chamber spacer 213, the second chamber spacer 216 and the bottom surface 214. In some examples other methods of creating a pore may be utilized such as in a non-limiting example a photolithography process to image a photoresist mask followed by a reactive ion etching process through the layers. Any technique to drill a small profile hole through insert pieces may be utilized.

Figure 2C:
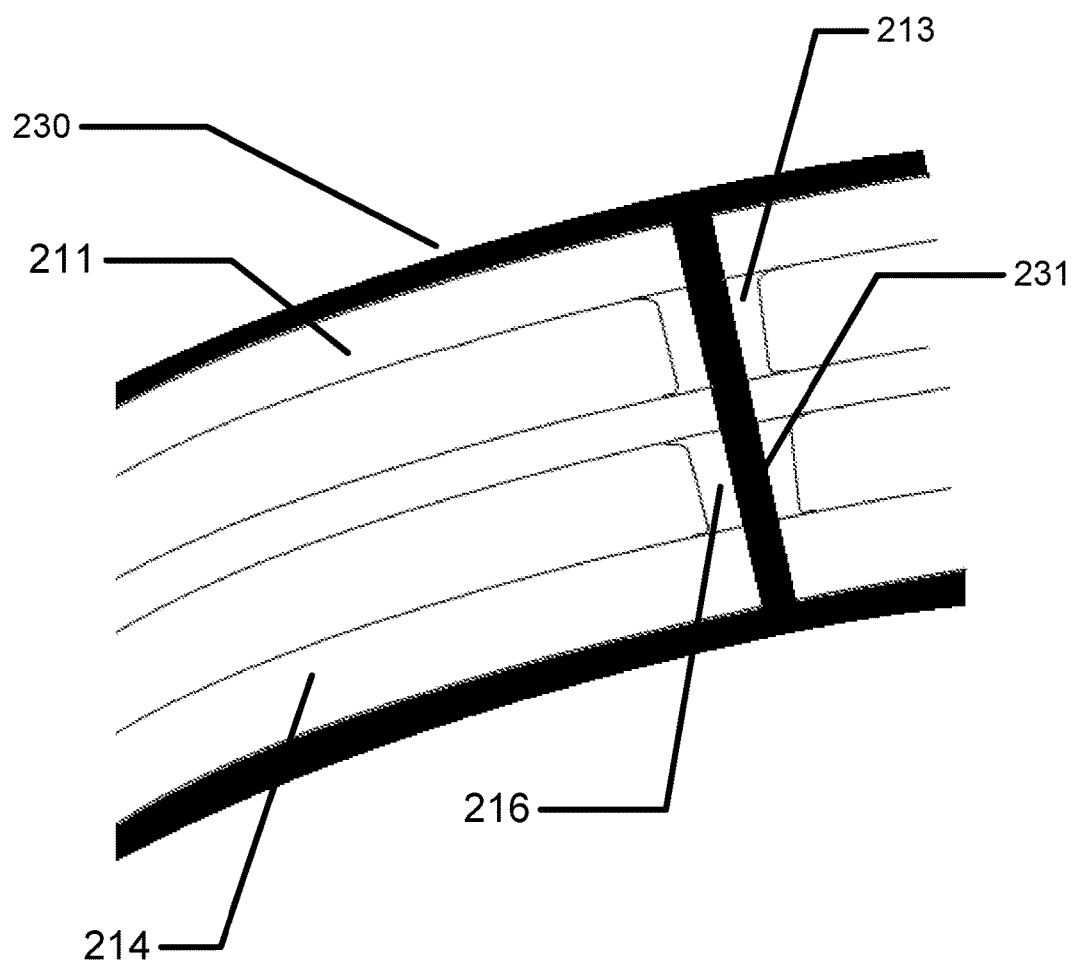
FIG. 2C illustrates a cross section illustrating exemplary filling with hydrogel of the through via in an exemplary insert device.

The pore 221 may be a path that allows oxygen to diffuse through the insert from the front of the electroactive lens to the back of the electroactive lens. If the pore exists in an encapsulated lens, the diffusion of tear fluid through the pore along with dissolved oxygen in the tear fluid may enhance oxygen levels along tissues of the user's eye surface under the lens insert region (as was depicted as 180 in FIG. 1C). In some examples, oxygen permeation may be very effective in hydrogel layers. Referring to FIG. 2C, a hydrogel layer 230 used to encapsulate a lens insert may also fill (or "back-fill") the pore with a layer of hydrogel in the pore 231. Oxygen may diffuse through tear fluid and hydrogel from a front surface through the lens body and into the hydrogel layers on the back surface of the lens and ultimately into a layer of tear fluid between the lens and the eye surface where it can then diffuse to the tissue layers of the eye.

Figure 2D:
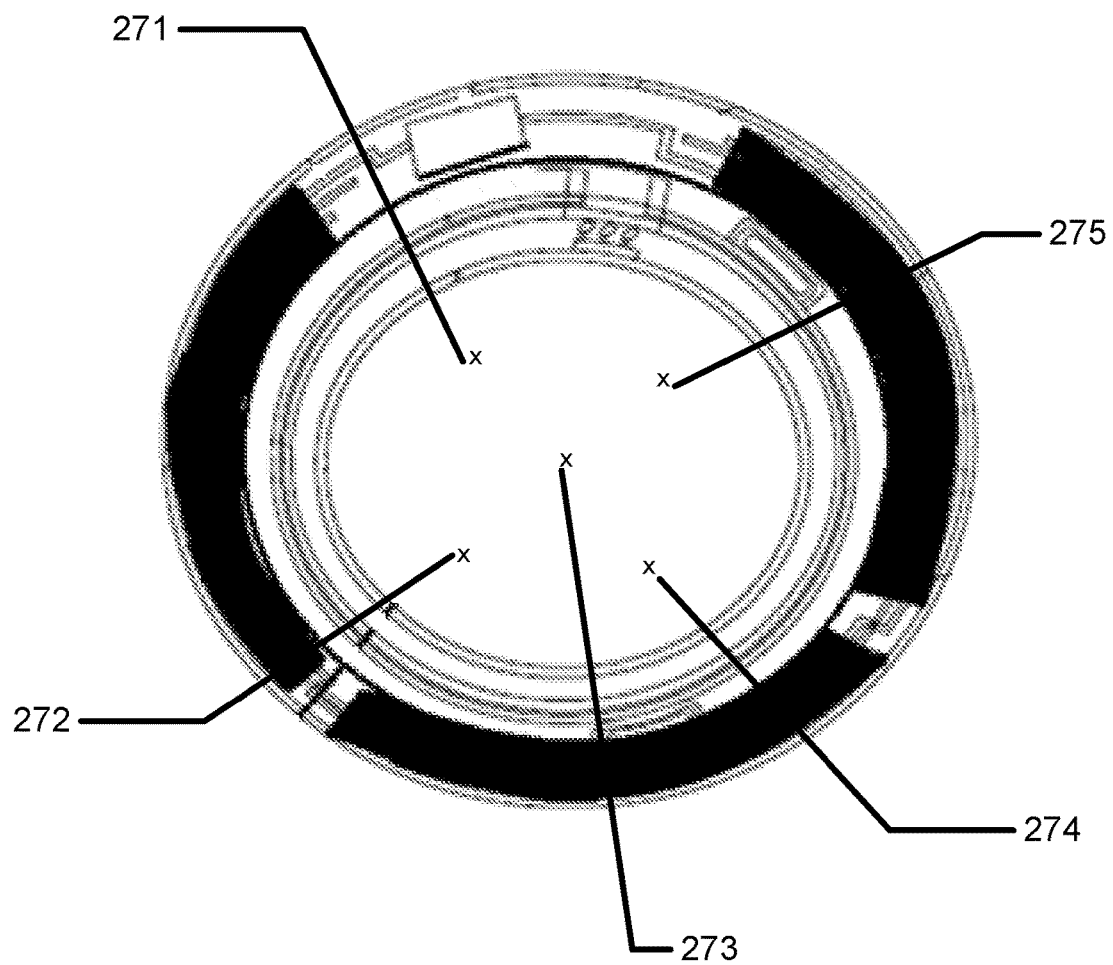
FIG. 2D illustrates exemplary placement of through vias within the body of an exemplary advanced contact lens.

Referring to FIG. 2D, a top down view of a lens insert with pores drilled through the body in various locations is illustrated. As illustrated, in an example, there may be five (5) holes cut into the insert device at features 271, 272, 273, 274 and 275. The actual number of pores may be more or less than those illustrated depending on a number of factors including factors such as degradation in imaging through the lens by the presence of pores and the effectiveness of increased oxygen levels versus distance from a pore. There may be other factors that impact the design of the pores individually and their pattern and number in the insert body.

It may be desirable to form the pore with a diameter on the order of approximately 20 microns. In order to fill the pore with hydrogel monomer, it may be desirable to evacuate the pore of gasses before filling a mold with monomer around the insert. By evacuating the gas phase around and within the pore, a better filling with monomer may result.

Figure 2E:
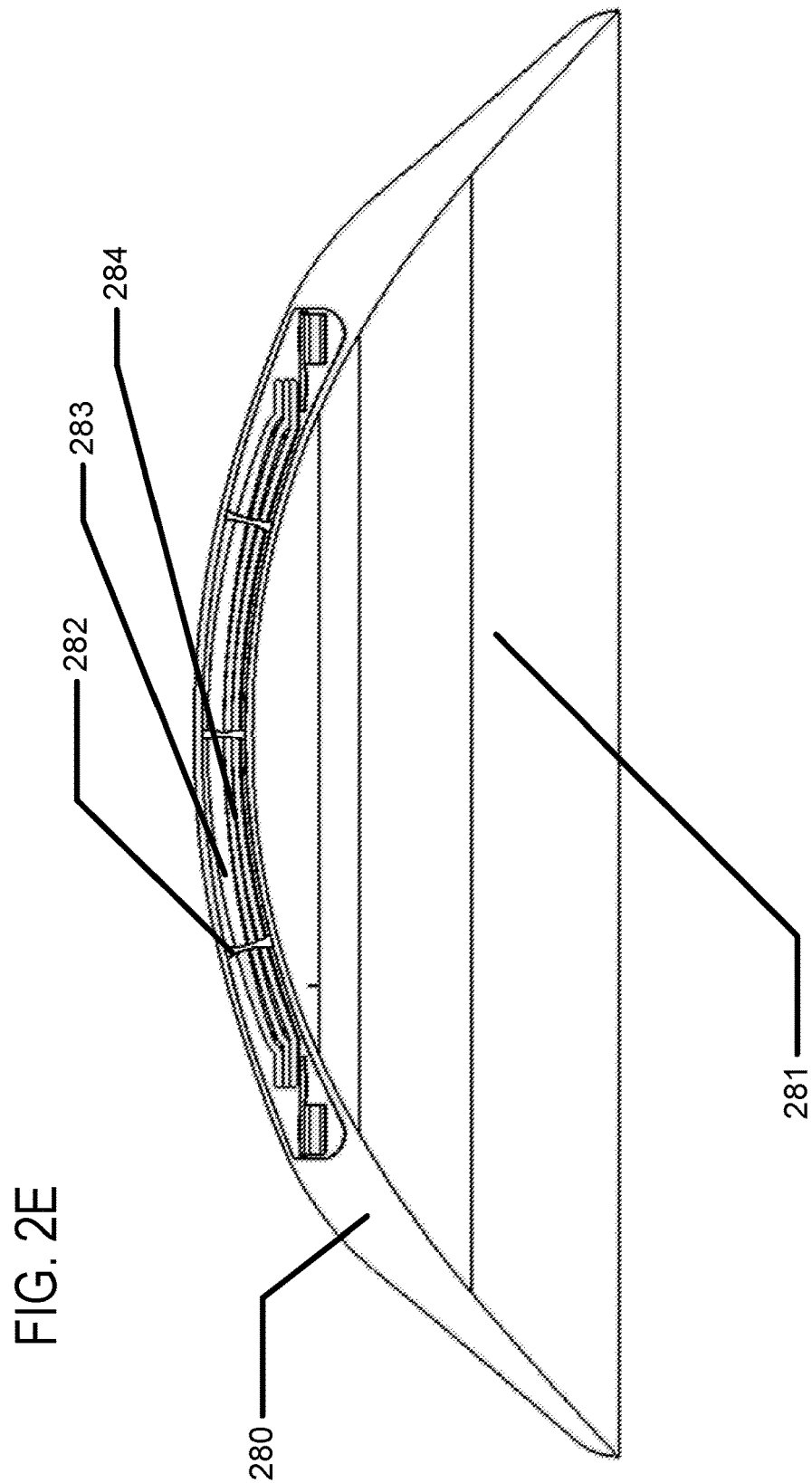
FIG. 2E illustrates an exemplary cross section with multilayer insert and hydrogel skirt with fluted through vias.

Referring to FIG. 2E an exemplary contact lens is illustrated in cross section. The contact lens skirt 280 in cross section, and 281 view from behind may surround an insert. The insert may have two chambers, a first chamber 283 and a second chamber 284. Through vias or holes are illustrated such as the exemplary through via 282. As illustrated, the laser drilling processing may result in profiles to the holes that are fluted with wider diameter near the surface of the lens.

Oxygen Absorption and Desorption

Another manner to increase oxygen in the space between an advanced contact lens and the eye surface may be to store an increased level of oxygen in the body of the lens. The increased level may be imparted to the lens by storing the lens in a pressurized oxygen environment before packaging the lens. There may be a number of material additions to layers in the lens that may impart the ability to store oxygen from the pressurized atmosphere. Ideally the materials that store the oxygen will desorb the oxygen as the level of oxygen in its vicinity drops. In other examples, the stored oxygen may be desorbed under an influence such as by the heating of the material.

Figure 3A:
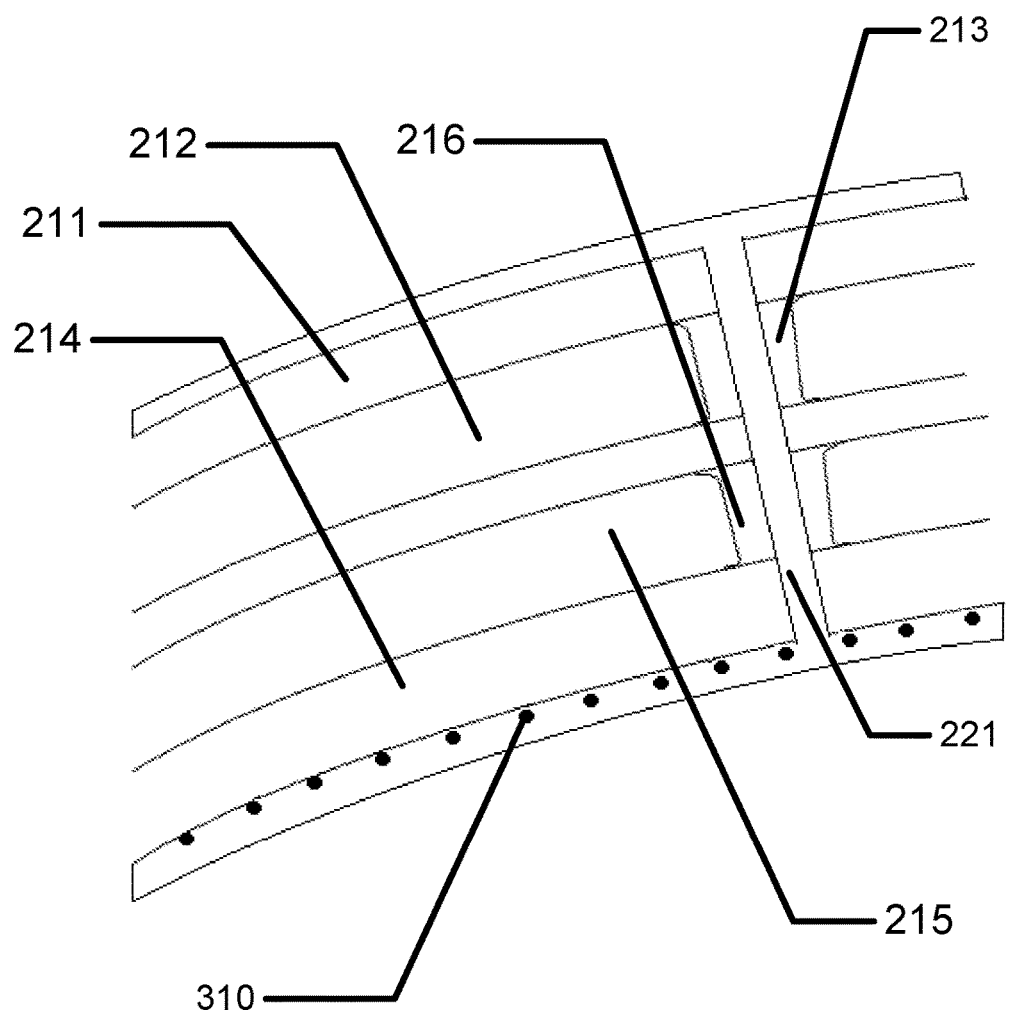
FIG. 3A illustrates exemplary incorporation of oxygen absorptive material within the body of an exemplary advanced contact lens.

Referring to FIG. 3A, a layer of absorptive material 310 may be embedded within an advanced contact lens. The general structure of the insert example is illustrated as in previous depictions including a top surface 211, a first chamber 212, a first chamber spacer 213, a bottom surface 214, a second chamber 215 and a second chamber spacer 216. In some examples, there may be a through via 221. In some examples, the absorptive material 310 may be deposited on the surface of the insert. In other examples, it may be embedded within the hydrogel skirt layer as a film or as in entrapped discrete elements. In some examples, the absorptive material 310 may be synthetic organometallic moieties based upon natural oxygen transport molecules or may be biological oxygen transport molecules such as hemoglobin, hemocyanin, another porphyrin based species or another metal organic framework molecular species. The absorptive material 310 may comprise metallic species such as iron, copper, and zirconium as non-limiting examples. These organometallic species may be integrated into the hydrogel layer and may reversibly desorb oxygen into the hydrogel layer. In some examples, desorption may be stimulated by electrical action on the layers of absorptive material, such as heating them. Due to the nature of the use environment, such heating may be limited to small regions of the absorptive material at a time. Other similar organic molecules may be embedded to perform a similar function.

In other examples, the absorptive material may comprise absorptive particles, such as zeolites that may be charged with oxygen. The particles may maintain an equilibrium level of oxygen in their surroundings. Therefore, when a package containing the advanced contact lens device is opened for use, a release of oxygen may occur, and the absorptive particle may begin desorbing oxygen. In some examples, the absorptive material may include zeolites of various composition such as sodium, cerium, silicon and aluminum for example. In other examples the absorptive/ adsorptive material may comprise polymers and doped polymers which absorb oxygen, such as polymers with unsaturated regions or phenolic regions in the backbone. Polymers may be doped with other species such as copper for example in a polyester and poly-butadiene structure. A super saturation of these absorptive particles under high pressure, high concentration and/or high partial pressure of oxygen, may result in a material that releases oxygen in low levels over time when the oxygen level in the ambient drops.

Figure 3B:
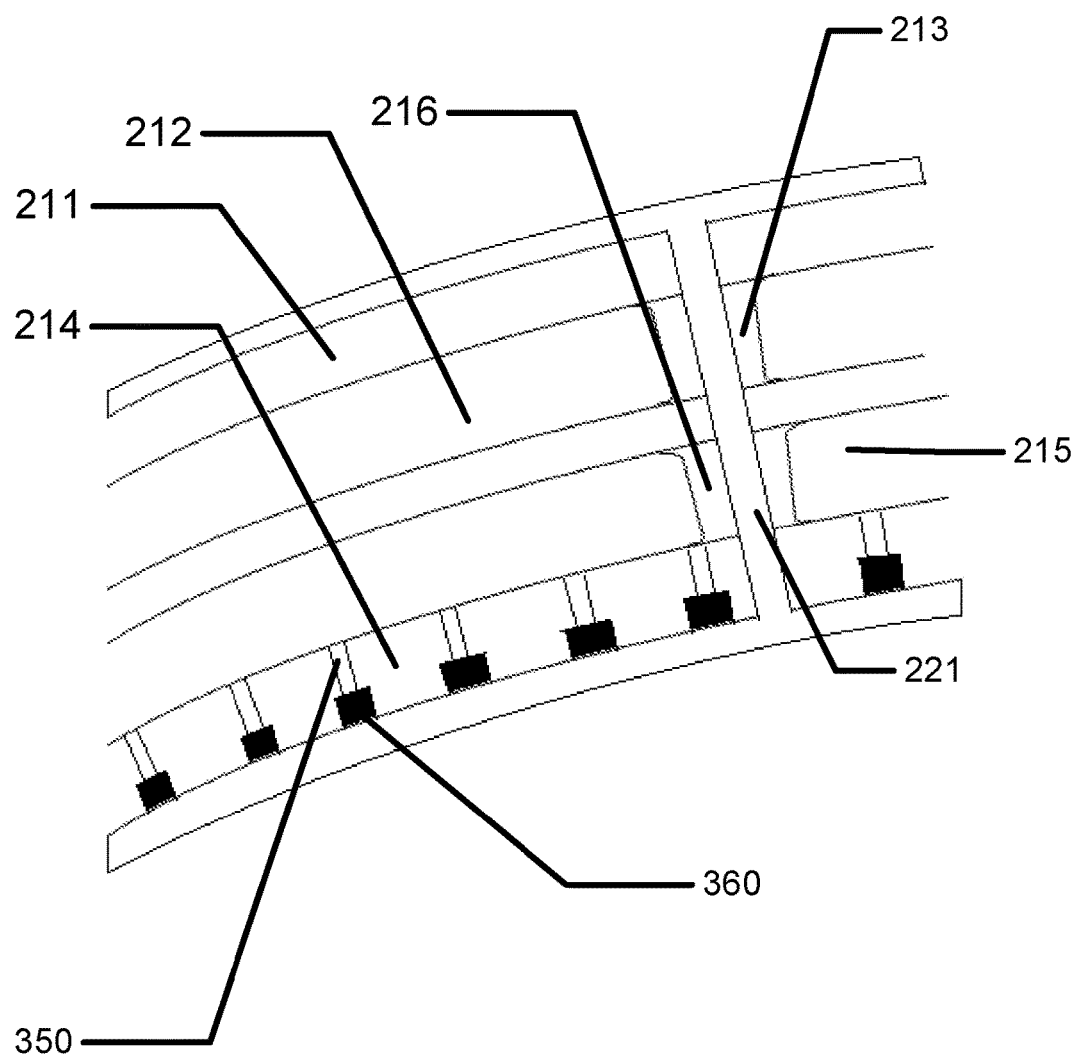
FIG. 3B illustrates exemplary electronically triggered oxygen containment elements within the body of an exemplary advanced contact lens.

Referring to FIG. 3B, an alternative but related device structure is illustrated. The general structure of the insert example is illustrated as in previous depictions including a top surface 211, a first chamber 212, a first chamber spacer 213, a bottom surface 214, a second chamber 215 and a second chamber spacer 216. In some examples, there may be a through via 221. A surface of the insert may be formed to comprise a series of oxygen containment or oxygen generation vessels shown as vessels 350. In some example the vessels 350 may contain pressurized oxygen. An electrically controllable release feature 360 may be formed upon the vessel containing the pressurized oxygen and upon an electric signal may release the oxygen. In some examples, the electrical signal may cause a thin metallic foil to melt in the process of releasing the stored oxygen.

In other examples, the vessel 350 may contain a segregated region of an oxygen containing chemical such as hydrogen peroxide. The electrically controllable release feature 360 may in these cases release hydrogen peroxide to flow into another region of the device where it may interact with a catalytic surface, such as the surface of zeolites, where the peroxide may decompose into water and evolved oxygen. In some examples, the vessel may be capped with a membrane that may allow oxygen to diffuse through while containing the other components such as the catalytic surface within the vessel.

The electroactive oxygen generator or releasing structure may be electrically programmed to be released at a particular time after a use cycle begins. A large number of these features may therefore be slowly and regionally triggered to enhance oxygen levels during a use cycle across regions underneath an insert of an advanced contact lens.

Movement of Oxygen Rich Fluids to Enhance Oxygenation

The general environment around an advanced contact lens during its use has ample levels of oxygen. However, in some cases the inhibition of diffusion through a contact lens by a sealed insert may be coupled with the fact that the thin layer of tear fluid between the hydrogel surface of the contact lens and the eye surface may not move significantly to exchange with more oxygenated regions peripheral to the insert region. In practice the hydrogel layers may provide effective transport of oxygen from peripheral regions towards regions under the insert, but the tissue in those regions may be consuming oxygen at a significant rate. Thus, if enhanced oxygen transport may be needed, it may be useful to enhance the movement of tear fluid under the insert region into and out of that region.

Referring to FIGS. 4A and 4B an electroactive pump 410 may be used to move fluid, more specifically tear fluid proximate to a user's eye surface. The general structure of the insert example is illustrated in FIG. 4A as in previous depictions including a top surface 211, a first chamber 212, a first chamber spacer 213, a bottom surface 214, a second chamber 215 and a second chamber spacer 216. In some examples, there may be a through via 221. As a relevant aside, if the tear fluid and hydrogel materials are matched relative to their index of refraction it may be possible to create channels 420 in the hydrogel that may fill with tear fluid, but which may not create an optically interacting structure. In some examples, when illustrated from top down, channels may be formed to include flow directing aspects, such as flap valves or profiled surfaces which may favor one direction of flow rather than another. In some examples, the height of such a channel may be less than approximately 20 microns and the width may be approximately 20-50 microns. In further examples, the height of such a channel may be less than approximately 5 microns. In still further examples, the height of such a channel may be less than approximately 1 micron. There may be numerous examples of heights and widths outside these exemplary amounts.

When illustrated from top down, an inward flowing channel 430 and an outward flowing channel 440 is illustrated. Again, very small features may be molded into the hydrogel to form these channels and the analog of flow check valves into the shape of the channels. The electroactive pump 410 may be comprised of a portion that expands or contracts upon an electrical signal, such as a piezoceramic or piezoelectric based transducer or electroactive elastomer or electroactive polymer based transducer. By contracting an electroactive body 411, an attached hydrogel feature 412 may move opening up the volume in a chamber 413 under the device. When the volume is opened up, fluid may be drawn into the chamber 413. In the opposite case, when the electrical signal is removed or reversed, the electroactive body 411 may expand, move down the hydrogel feature 412 and cause fluid in the chamber 413 to be pushed out of channels. Thus, oxygen laden fluid may be moved from peripheral regions through a network of channels under the insert region of an advanced contact lens. In some examples, a relatively slow and steady pumping action may result in the user not being perturbed either physically or optically during the pumping action. In some other examples, the pumping action may be programmed to be intermittent and may, for example, coincide with a detection of blinking of the eye.

Figure 5:
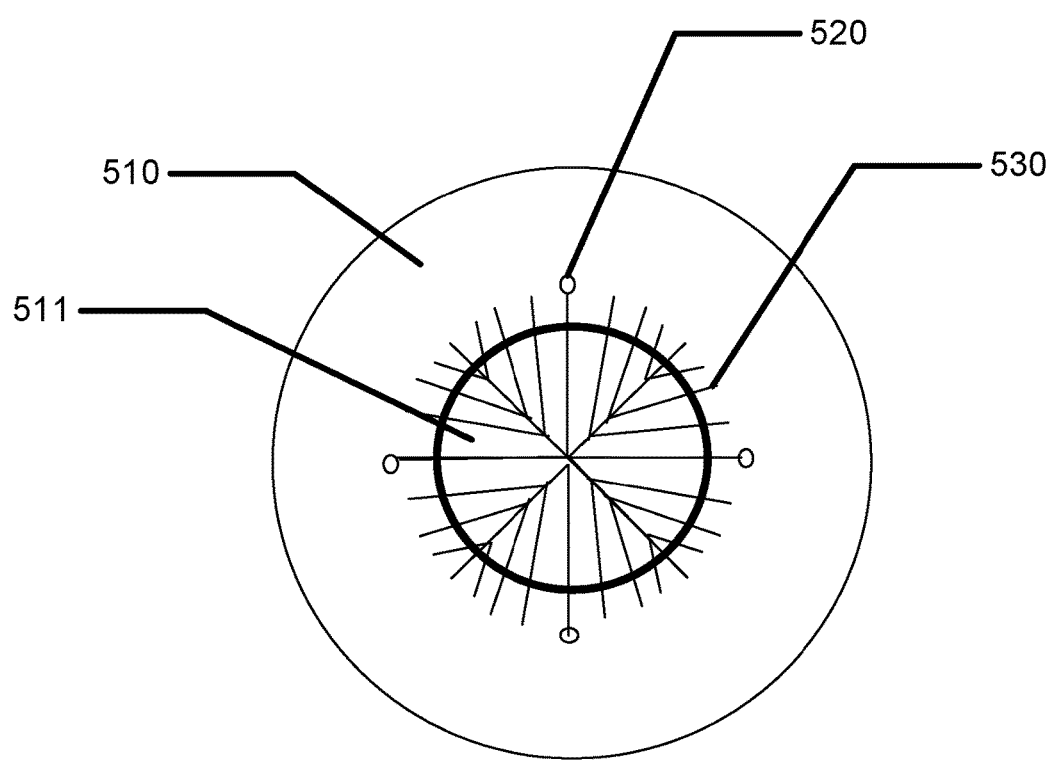
FIG. 5 illustrates an exemplary passive channel system that may interact with eyelid blinking to move fluids under an exemplary advanced contact lens.

Referring to FIG. 5 a similar channel based distribution of oxygenated fluid is illustrated where the pumping mechanism may be passive, i.e. may not involve an electroactive pump. When a user's eye lid blinks it may impart force to engage a pumping mechanism. In some examples, the force may compress channels and allow for fluid to be squeezed out of the channels in the region under the insert 511 to the peripheral region 510. After the lid moves by, the channels may again expand drawing new oxygen laden fluid in from the peripheral regions. In another example, there may be protrusions 520 in the peripheral regions of the lens that are forced downward as the user's eyelid goes by them in both directions. With an appropriate level of flow direction (i.e. check valve type action) in the channels, the force downward on the protrusions and their effect on neighboring regions may pump fluid along a network of channels 530 exchanging fluid from external regions to internal regions. In some examples, the channels 530 may be formed into a hydrogel encapsulating skirt and may be approximately 50 microns or less in height and a width that maintains the presence of a channel when the contact lens is worn. As an example, the width of a channel 530 may also be approximately 50 microns in dimension or less. The protrusions may be made smooth and shallow in some examples to enhance comfort in a user while affording the necessary forced interaction for engagement of a pumping action.

Materials for Lens Formation and Lens Skirts

Microinjection molding examples may include, for example, a poly (4-methylpent-1-ene) copolymer resin are used to form lenses with a diameter of between about 6 mm to 10 mm and a front surface radius of between about 6 mm and 10 mm and a rear surface radius of between about 6 mm and 10 mm and a center thickness of between about 0.050 mm and 1.0 mm. Some examples include an insert with diameter of about 8.9 mm and a front surface radius of about 7.9 mm and a rear surface radius of about 7.8 mm and a center thickness of about 0.200 mm and an edge thickness of about 0.050 mm.

The contact lens insert 100 illustrated in FIG. 1A may be placed in a mold part utilized to form an ophthalmic lens. The material of mold parts may include, for example, a polyolefin of one or more of: polypropylene, polystyrene, polyethylene, polymethyl methacrylate, and modified polyolefins. Other molds may include a ceramic or metallic material.

A preferred alicyclic co-polymer contains two different alicyclic polymers. Various grades of alicyclic co-polymers may have glass transition temperatures ranging from 105° C. to 160° C.

In some examples, the molds of the present invention may contain polymers such as polypropylene, polyethylene, polystyrene, polymethyl methacrylate, modified polyolefins containing an alicyclic moiety in the main chain and cyclic polyolefins. This blend may be used on either or both mold halves, where it is preferred that this blend is used on the back curve and the front curve consists of the alicyclic co-polymers.

In some preferred methods of making molds according to the present invention, injection molding is utilized according to known techniques, however, examples may also include molds fashioned by other techniques including, for example: lathing, diamond turning, or laser cutting.

In some examples, a preferred lens material includes a silicone containing component. A "silicone-containing component" is one that contains at least one [—Si—O—] unit in a monomer, macromer or prepolymer. Preferably, the total Si and attached O are present in the silicone-containing component in an amount greater than about 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, vinyl, N-vinyl lactam, N-vinylamide, and styryl functional groups.

In some examples, the ophthalmic lens skirt, also called an insert-encapsulating layer, that surrounds the insert may be comprised of standard hydrogel ophthalmic lens formulations. Exemplary materials with characteristics that may provide an acceptable match to numerous insert materials may include, the Narafilcon family (including Narafilcon A and Narafilcon B), and the Etafilcon family (including Etafilcon A). A more technically inclusive discussion follows on the nature of materials consistent with the art herein. One ordinarily skilled in the art may recognize that other material other than those discussed may also form an acceptable enclosure or partial enclosure of the sealed and encapsulated inserts and should be considered consistent and included within the scope of the claims.

Suitable silicone containing components include compounds of Formula I

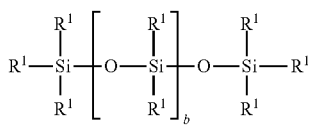

where $R^1$ is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

where b=0 to 500, where it is understood that when b is other than 0, b is a distribution having a mode equal to a stated value;

wherein at least one $R^1$ comprises a monovalent reactive group, and in some examples between one and 3 $R^1$ comprise monovalent reactive groups.

As used herein "monovalent reactive groups" are groups that may undergo free radical and/or cationic polymerization. Non-limiting examples of free radical reactive groups include (meth)acrylates, styryls, vinyls, vinyl ethers, $C_{1-6}$alkyl(meth)acrylates, (meth)acrylamides, C1-6alkyl (meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl$C_{1-6}$alkyls, O-vinylcarbamates and O-vinylcarbonates. Non-limiting examples of cationic reactive groups include vinyl ethers or epoxide groups and mixtures thereof. In one embodiment the free radical reactive groups comprises (meth)acrylate, acryloxy, (meth)acrylamide, and mixtures thereof.

Suitable monovalent alkyl and aryl groups include unsubstituted monovalent $C_1$ to $C_{16}$alkyl groups, $C_6$-$C_{14}$ aryl groups, such as substituted and unsubstituted methyl, ethyl, propyl, butyl, 2-hydroxypropyl, propoxypropyl, polyethyleneoxypropyl, combinations thereof and the like.

In one example, b is zero, one $R^1$ is a monovalent reactive group, and at least 3 $R^1$ are selected from monovalent alkyl groups having one to 16 carbon atoms, and in another example from monovalent alkyl groups having one to 6 carbon atoms. Non-limiting examples of silicone components of this embodiment include 2-methyl-,2-hydroxy-3-[3-[1,3,3,3-tetramethyl-1-[(trimethylsilyl)oxy]disiloxanyl] propoxy]propyl ester ("SiGMA"), 2-hydroxy-3-methacryloxypropyloxypropyl-tris (trimethylsiloxy)silane, 3-methacryloxypropyltris(trimethylsiloxy)silane ("TRIS"), 3-methacryloxypropylbis(trimethylsiloxy)methylsilane and 3-methacryloxypropylpentamethyl disiloxane.

In another example, b is 2 to 20, 3 to 15 or in some examples 3 to 10; at least one terminal $R^1$ comprises a monovalent reactive group and the remaining $R^1$ are selected from monovalent alkyl groups having 1 to 16 carbon atoms, and in another embodiment from monovalent alkyl groups having 1 to 6 carbon atoms. In yet another embodiment, b is 3 to 15, one terminal $R^1$ comprises a monovalent reactive group, the other terminal $R^1$ comprises a monovalent alkyl group having 1 to 6 carbon atoms and the remaining $R^1$ comprise monovalent alkyl group having 1 to 3 carbon atoms. Non-limiting examples of silicone components of this embodiment include (mono-(2-hydroxy-3-methacryloxypropyl)-propyl ether terminated polydimethylsiloxane (400-1000 MW)) ("OH-mPDMS"), monomethacryloxypropyl terminated mono-n-butyl terminated polydimethylsiloxanes (800-1000 MW), ("mPDMS").

In another example, b is 5 to 400 or from 10 to 300, both terminal $R^1$ comprise monovalent reactive groups and the remaining $R^1$ are independently selected from monovalent alkyl groups having 1 to 18 carbon atoms, which may have ether linkages between carbon atoms and may further comprise halogen.

In one example, where a silicone hydrogel lens is desired, the lens of the present invention will be made from a reactive mixture comprising at least about 20 and preferably between about 20 and 70% wt silicone containing components based on total weight of reactive monomer components from which the polymer is made.

In another embodiment, one to four R[1] comprises a vinyl carbonate or carbamate of the formula:

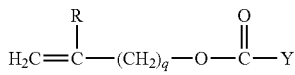

Formula II wherein: Y denotes O—, S— or NH—;
R denotes, hydrogen or methyl; d is 1, 2, 3 or 4; and q is 0 or 1.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio) propyl-[tris (trimethylsiloxy)silane]; 3-[tris (trimethylsiloxy)silyl] propyl allyl carbamate; 3-[tris (trimethylsiloxy)silyl] propyl vinyl carbamate; trimethylsilylethyl vinyl carbonate; trimethylsilylmethyl vinyl carbonate, and

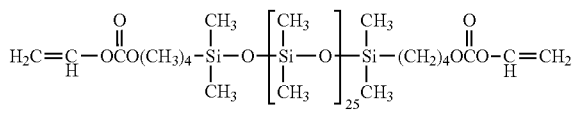

Where biomedical devices with modulus below about 200 are desired, only one R[1] shall comprise a monovalent reactive group and no more than two of the remaining R[1] groups will comprise monovalent siloxane groups.

Another class of silicone-containing components includes polyurethane macromers of the following formulae:

(*D*A*D*G)$_a$*D*D*E[1];

E(*D*G*D*A)$_a$*D*G*D*E[1] or;

E(*D*A*D*G)$_a$*D*A*D*E[1]     Formulae IV-VI wherein:
D denotes an alkyl diradical, an alkyl cycloalkyl diradical, a cycloalkyl diradical, an aryl diradical or an alkylaryl diradical having 6 to 30 carbon atoms,
G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;
* denotes a urethane or ureido linkage;
$a$ is at least 1;
A denotes a divalent polymeric radical of formula:

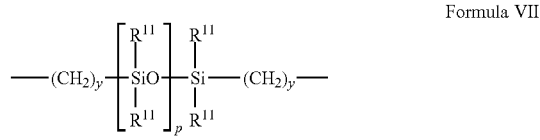

Formula VII

R11 independently denotes an alkyl or fluoro-substituted alkyl group having 1 to 10 carbon atoms, which may contain ether linkages between carbon atoms; y is at least 1; and p provides a moiety weight of 400 to 10,000; each of E and E1 independently denotes a polymerizable unsaturated organic radical represented by formula:
Formula VIII
wherein: R12 is hydrogen or methyl; R13 is hydrogen, an alkyl radical having 1 to 6

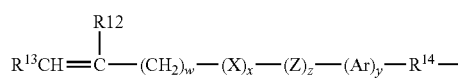

carbon atoms, or a —CO—Y—R15 radical wherein Y is —O—, Y—S— or —NH—; R14 is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

A preferred silicone-containing component is a polyurethane macromer represented by the following formula:

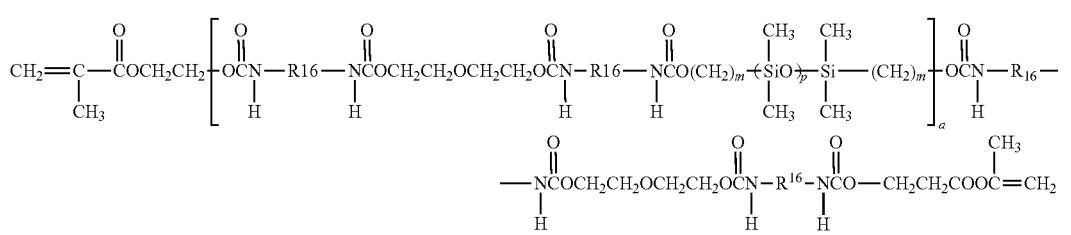

Formula IX wherein R16 is a diradical of a diisocyanate after removal of the isocyanate group, such as the diradical of isophorone diisocyanate. Another suitable silicone containing macromer is compound of formula X (in which x+y is a number in the range of 10 to 30) formed by the reaction of fluoroether, hydroxy-terminated polydimethylsiloxane, isophorone diisocyanate and isocyanatoethylmethacrylate.

Formula X

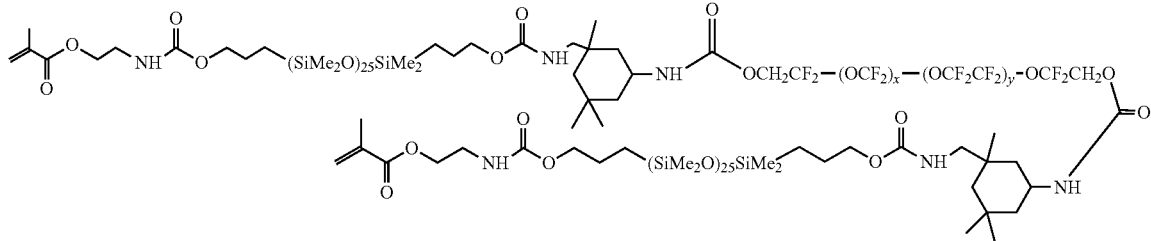

Other silicone containing components suitable for use in this invention include macromers containing polysiloxane, polyalkylene ether, diisocyanate, polyfluorinated hydrocarbon, polyfluorinated ether and polysaccharide groups; polysiloxanes with a polar fluorinated graft or side group having a hydrogen atom attached to a terminal difluoro-substituted carbon atom; hydrophilic siloxanyl methacrylates containing ether and siloxanyl linkages and crosslinkable monomers containing polyether and polysiloxanyl groups. Any of the foregoing polysiloxanes may also be used as the silicone containing component in the present invention.

Formulations of the skirt materials as have been describe may be configured to create a skirt layer that has structural strength to maintain channels of various sizes while being worn upon a user's eyes. In some examples, the channels may be molded into the skirt as it is formed. In other examples, the channels may be cut or eroded from the molded material. The skirt material may also be configured so that it has an optical index of refraction that closely matches that of tear fluid for an average human user. Thus, the presence of molding features, which may occur in the optic zone of the aforementioned examples of advanced contact lenses may be rendered non optically active when they fill with tear fluid after being placed upon the user's eyes. As mentioned previously, various shapes and profiles of the channels may be formed for different purposes such as enhancing directional flow of fluids within the channels.

The methods and apparatus to enhance oxygenation in regions proximate to an electroactive component in a biomedical device may be designed and incorporated into numerous other types of biomedical devices. The biomedical devices may be, for example, implantable electronic devices, such as pacemakers and micro-energy harvesters, electronic pills for monitoring and/or testing a biological function, surgical devices with active components, ophthalmic devices, and the like.

Specific examples have been described to illustrate embodiments for the formation, methods of formation, and apparatus of formation of biocompatible devices to enhance levels of oxygen in regions of tissue of a user of the electroactive biomedical device. These examples are for illustration and are not intended to limit the scope of the claims in any manner. Accordingly, the description is intended to embrace all embodiments that may be apparent to those skilled in the art.

What is claimed is:

1. A contact lens comprising:
   a hydrogel skirt, wherein the hydrogel skirt is molded into a shape of the contact lens, with an arcuate back surface placed proximate to a user's cornea during a use of the contact lens;
   an insert including one or more components mounted thereon, wherein the insert is gas impermeable and impermeable to fluid flow through its body, the insert comprising a dual chamber structure with one chamber positioned above the other chamber, wherein the insert and the one or more components is encapsulated within the hydrogel skirt;
   a first region of the hydrogel skirt, wherein the first region of the hydrogel skirt is that portion of the hydrogel skirt that is between a surface of the insert and a cornea of a user during the use of the contact lens; and
   an electroactive oxygen generator comprising a vessel that stores a fluid comprising an oxygen containing chemical, wherein an electrical signal causes the electroactive oxygen generator to release the fluid comprising the oxygen containing chemical to interact with a catalytic surface to evolve oxygen gas.

2. The contact lens according to claim 1, wherein the fluid comprises hydrogen peroxide.

\* \* \* \* \*